April 13, 1965 H. P. THOMAS 3,178,649

SLOPE EQUALIZER

Filed June 21, 1960 2 Sheets-Sheet 1

INVENTOR.
HENRY P. THOMAS

BY Isidore Match

ATTORNEY

INVENTOR.
HENRY P. THOMAS
BY Isidore Match
ATTORNEY

United States Patent Office 3,178,649
Patented Apr. 13, 1965

3,178,649
SLOPE EQUALIZER

Henry P. Thomas, Lynchburg, Va., assignor to General Electric Company, a corporation of New York Filed June 21, 1960, Ser. No. 37,605
4 Claims. (Cl. 330—52)

This invention relates to automatic gain control circuits. More particularly, it relates to slope equalizer circuits for stabilizing the gain of amplifiers in those situations where selective fading may occur.

In the reception of single sideband signals in which the carrier has been suppressed, it is necessary to reinsert the carrier at the receiver prior to detection of the modulating intelligence. In order for the modulating intelligence to be faithfully reproduced, it is generally necessary that the reinserted carrier be within a few cycles of the correct value. At relatively low carrier frequencies, the necessary accuracy can be obtained by the use of stable crystal oscillators at the transmitter and the receiver. At high transmission frequencies, however, it has been found that crystal oscillators, by themselves, do not maintain a frequency with sufficient accuracy over long times under working conditions. It is then necessary to transmit a pilot signal to the receiver for the purpose of indicating at the receiving point, the correct frequency to be reinserted. The pilot signal can be transmitted as a carrier of reduced amplitude or some other frequency related to the original transmitting carrier.

Generally, a receiver for a single sideband system is gain controlled by selecting the transmitted pilot signal at the receiver and thereafter maintaining the pilot signal at a substantially constant amplitude level. In this type system, the pilot signal is amplified and detected to produce a control voltage which is compared against a fixed reference voltage. The difference between the two voltages is then utilized to control the gain of the intermediate frequency amplifier in the receiver.

If a receiver is utilized in a single sideband system, for receiving signals that experience selective fading, it is necessary to provide an arrangement for correcting any resulting slope in the output signal. This, heretofore, has been usually accomplished by using two pilot signals, one at either end of the frequency band being transmitted and utilizing the voltage level between them to control a slope equalizing device. In such arrangement, the two pilot signals are converted to respective unidirectional current voltages proportional to the pilot signal voltages and the difference therebetween is obtained to control the slope equalizer. For example, a usual technique for correcting for selective fading in signals received by a receiver in a single sideband system is to transmit the pilot signals at a fixed level at each end of the frequency band being transmitted and at the receiving point to separate these pilot signals from the other transmitted information by frequency selective circuits. The pilot signals are then used to control amplifiers which check for the variation of level at various frequencies in the received frequency band. To accomplish such correction, an amplifier is required which can have its amplitude frequency response varied from a positive to a negative slope.

Accordingly, it is an important object of this invention to provide a slope equalizer including an amplifier adapted to have its amplitude frequency response varied from a positive to a negative slope.

It is a further object of the invention to provide a slope equalizer in accordance with the preceding object wherein efficient performance is obtained over a substantial percentage of the center frequency and wherein the voltage that is developed departs from a linear slope at a 90° phase angle at most by a quite small percentage in amplitude and by a very few degrees in phase.

Generally speaking and in accordance with the invention, there is provided in combination, first and second amplifiers, each having an input, the amplifiers having a combined output. Connected across the input of the first amplifier, there is provided first means which presents a minimum impedance to a signal of a first chosen frequency and connected across the input of the second amplifier there is provided second means which presents a minimum impedance to a signal of a second chosen frequency whereby the amplitude frequency response of one of said amplifiers has a positive amplitude frequency response slope at frequencies between the chosen frequencies and the other has a negative amplitude frequency response slope at the in-between frequencies. Means are included for extracting the signal having the first chosen frequency from the combined output of the amplifiers and means are also included for extracting the signal of having the second chosen frequency from such combined output. There are further provided means for applying the first extracted signal as a gain control voltage to the input of the first amplifier and means for applying the second extracted signal as a gain control voltage to the input of the second amplifier.

The features of this invention which are believed to be new are set forth with particularity in the appended claims. The invention itself, however, may best be understood by reference to the following description when taken in conjunction with the accompanying drawings which show embodiments of a control system according to the invention.

Figure 1:
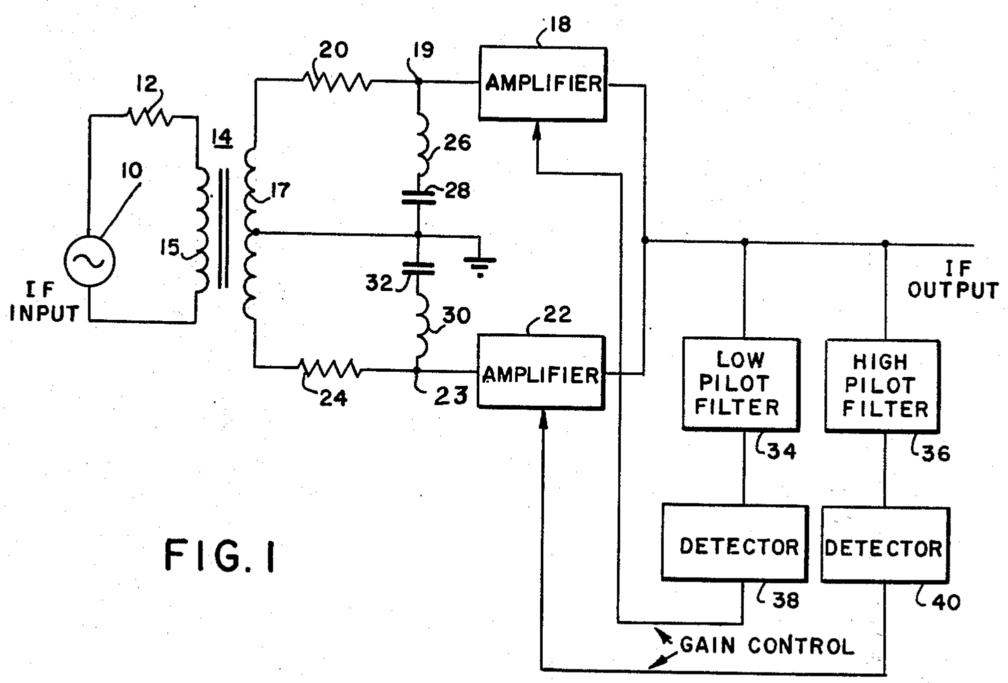
FIG. 1 is a depiction of an arrangement for providing a slope equalizer wherein the amplifiers therein are adapted to have their amplitude frequency response characteristics respectively varied from a positive to a negative slope.
Figures 3, 4:
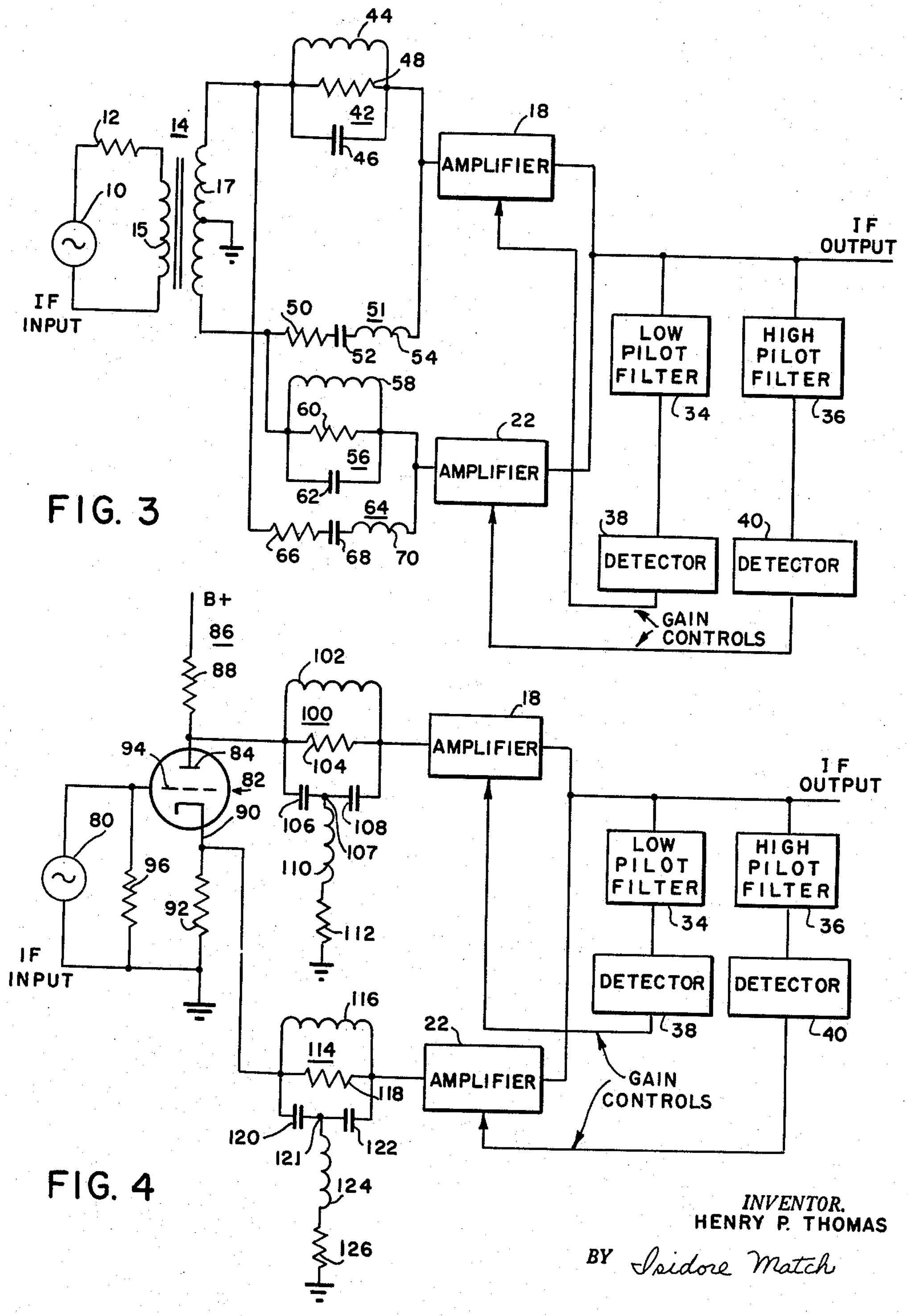

FIG. 3 is a depiction of another embodiment of a slope equalizer in accordance with the invention wherein the effect of losses encountered in the series tuned circuits of the slope equalizer of FIG. 1 is substantially minimized; and FIG. 4 is a depiction of still another embodiment of a slope equalizer in accordance with the invention and similar to the embodiment of FIG. 3 wherein the effect of losses encountered in the tuned circuits respectively of the slope equalizer of FIG. 1 is also substantially minimized.

Referring now to FIG. 1, the generator 10 is intended to schematically depict the input to the intermediate frequency stage of a receiver in a single sideband system, such input containing a low and a high pilot signal. This voltage is applied through a resistor 12 to a transformer 14 comprising a primary winding 15 and a secondary winding 17, the mid-point of secondary winding 17 being connected to ground. The voltage appearing at the upper terminal of secondary winding 17 is applied to an amplifier 18 through a resistor 20, and the voltage appearing at the lower terminal of secondary winding 17 is applied to an amplifier 22 which is similar to amplifier 18 through a resistor 24.

Connected between the junction 19 of resistor 20 and the input to amplifier 18 and ground is a series circuit comprising an inductor 26 and a capacitor 28, and connected between the junction 23 of resistor 24 and the input to amplifier 22 and ground is a series circuit comprising an inductor 30 and a capacitor 32. The combined output of amplifiers 18 and 22 is applied to a filter 34 for extracting the low pilot signal present in the voltage applied to the circuit and to a filter 36 for extracting the high pilot signal present in the voltage applied to the circuit. The outputs of filters 34 and 36 are applied respectively to detectors 38 and 40 to convert such outputs to substantially unidirectional potentials, the outputs of detectors 38 and 40 being respectively applied to amplifiers 18 and 22 as gain control voltages. Amplifiers 18 and 22 may be conventional amplifiers wherein the active device preferably is a multi-element tube such as a tetrode or a pentode whereby the outputs of amplifiers 18 and 22 can be directly combined without the use of a combining circuit. Detectors 38 and 42 may be conventional detectors for providing unidirectional potentials from alternating current potentials. The intermediate frequency output is taken at the combined outputs of amplifiers 18 and 22.

In considering the operation of the circuit of FIG. 1, it is recalled that the intermediate frequency input to the circuit contains a pilot signal at the lower end of the frequency band being received and a pilot signal at the upper end of the band being received, both of these signals having been transmitted at a fixed level to the receiver in which the slope equalizer circuit is contained. The values of inductor 26 and capacitor 28 are chosen so that they comprise a series arrangement which is resonant at the frequency of the low pilot signal. The values of inductor 30 and capacitor 32 are so chosen that they comprise a series arrangement which is resonant at the frequency of the high pilot signal.

Figure 2:
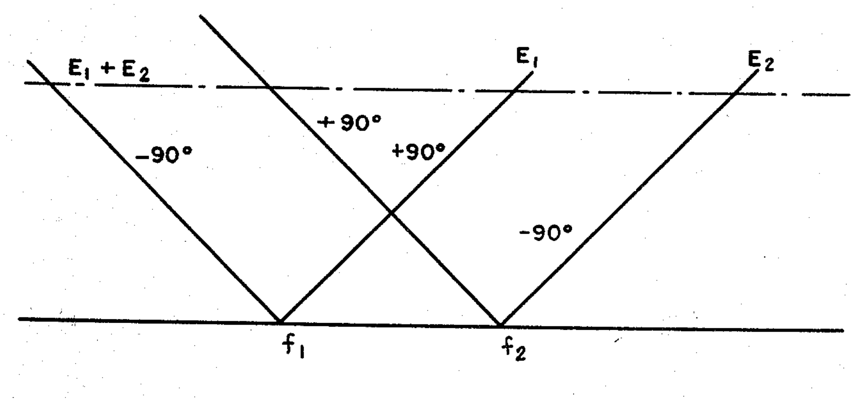
FIG. 2 is a graph showing the amplitude frequency response characteristics of the amplifiers of FIG. 1.

The operation of the circuit may best be understood at this point by reference to the graph of FIG. 2. In this graph, $f_1$ represents the frequency of the low pilot signal and $f_2$ represents the frequency of the high pilot signal. The lower horizontal line is the zero or ground voltage line and the upper dashed horizontal line is the voltage at the output of the circuit. The slant lines associated with frequency $f_1$ are the amplitude frequency response characteristic of amplifier 18 and the slant lines associated with the frequency $f_2$ are the amplitude frequency response characteristic of amplifier 22.

It is seen that the reactance of the series combination of inductor 26 and capacitor 28, at frequencies lower than frequency $f_1$ is capacitive whereby there is a $-90°$ phase shift, of course assuming that there are no losses in the circuit. The amplitude frequency response of amplifier 18 at these frequencies accordingly slants from a positive to a zero value, i.e., its slope is negative. When the frequency applied to amplifier 18 is greater than the frequency of the low pilot signal, the reactance of the combination of inductor 26 and capacitor 28 is inductive, whereby there is a positive 90° phase shift and whereby the amplitude frequency response characteristic of amplifier 18 has a positive slope.

The same results ensue from the application of all frequencies less than the high pilot signal to amplifier 22. Thus, the reactance of the series combination of capacitor 32 and inductor 30 is capacitive at frequencies below the frequency of the high pilot signal $f_2$ and inductive at all frequencies exceeding the frequency of the high pilot signal frequency. It is to be noted in FIG. 2 that with frequency $f_2$, i.e., in amplifier 22, the phase shift is designated as $+90°$ on the negative slope line and as $-90°$ on the positive slope line. These designations are used to take into account the 180° difference in phase of the signal at the lower terminal of secondary winding 17 with respect to the phase at the upper terminal of winding 17.

It is thus seen that the gain of amplifier 18 is at a maximum at the frequency of the high pilot signal and the gain of amplifier 22 is at a maximum at the frequency of the low pilot signal.

The combined output of amplifiers 18 and 22 are applied to filters 34 and 36, as previously described, the outputs of which are detected in detectors 38 and 40 respectively. The outputs of detectors 38 and 40 which are substantially unidirectional potentials are applied as gain control voltages to amplifiers 18 and 22. Thus, the result is to provide an intermediate frequency output that has a flat slope as depicted by the dashed line in FIG. 2 and designated as $E_1+E_2$.

The circuit of FIG. 1 although quite effective for the purposes of the principles of this invention may present the disadvantage of losses introduced because of the presence of resistance in the resonant circuits. Because of such resistance, the voltage developed across these circuits will not decrease to zero at series resonance and undergoes a change of phase at series resonance, such change being an angle of 90°.

In FIG. 3 there is shown a slope equalizer employing low Q circuits for obtaining effects similar to those described in connection with the series tuned circuits of FIG. 1. In the circuit of FIG. 3, there are utilized lattice arrangements in the place of series tuned circuits. Since the remaining components of the circuit are the same as of FIG. 1, the same designating numerals for corresponding components have been utilized respectively in connection therewith.

Thus, in FIG. 3, connected to the upper terminal of secondary winding 17 is a parallel arrangement 42 of an inductor 44, a capacitor 46 and the resistor 48 and connected to the lower terminal of secondary winding 17 is a series arrangement 51 of a resistor 50, a capacitor 52 and an inductor 54. Parallel arrangement 42 and series arrangement 51 are connected in parallel, the junction thereof being connected to the input of amplifier 18. Similarly, the lower terminal of secondary winding 17 is connected to a parallel arrangement 56 of an inductor 58, a resistor 60 and a capacitor 62 and the upper terminal of secondary winding 17 is connected to a series arrangement 64 of a resistor 66, a capacitor 68 and an inductor 70. The junction of parallel arrangement 56 and series arrangement 64 is applied to the input of amplifier 22.

In accordance with the operation of lattice arrangements as described in "Electromechanical Transducers and Wave Filters" by W. P. Mason and published in 1948 by D. Van Nostrand Company, Inc., the effect of the resistance present in the tuned circuits of the slope equalizer shown in FIG. 1 is balanced out by the lattice arrangements in the circuit of FIG. 3.

In the circuit of FIG. 3, capacitor 52 and inductor 54 are chosen to have values whereby their series combination is resonant at the low pilot frequency and the values of capacitor 68 and inductor 70 are chosen so that their series combination is resonant at the high pilot frequency. The value of inductor 44 is equal to the value of inductor 54, the value of capacitor 46 is equal to the value of capacitor 52, the value of inductor 58 is equal to the value of inductor 70, and the value of capacitor 62 is equal to the value of capacitor 68.

In FIG. 4 there is shown a circuit similar to that of FIG. 3 but utilizing bridged T arrangements which are equivalent to the lattice arrangements of FIG. 3. In this circuit, the IF input may be applied to a phase inverter comprising a triode 82 having an anode 84 connected to a source of positive potential 86 through a resistor 88, a cathode 90 connected to ground through an unbypassed resistor 92 and a control grid 94 returned to ground through a resistor 96. The outputs are taken from cathode 90 and anode 84. The bridged T circuit connected to anode 84 comprises a parallel arrangement 100 of an inductor 102, a resistor 104, and series arrangement of capacitors 106 and 108, the junction 107 of capacitors 106 and 108 being connected to ground through a series arrangement of an inductor 110 and a resistor 112. The bridged T circuit connected to cathode 90 comprises a parallel arrangement 114 of an inductor 116, a resistor 118, and a series arrangement of a capacitor 120 and a capacitor 122, the junction 121 of capacitors 120 and 122 being connected to ground through a series arrangement of an inductor 124 and a resistor 126.

In accordance with the theory of the equivalency of lattice and bridged T networks, specifically for example, in the circuits of FIGS. 3 and 4, the value inductor 102 is twice the value of inductor 44, the value of inductor 116 is twice the value of inductor 58, the value of resistor 104 is twice the value of resistor 48 and the value of resistor 118 is twice the value of resistor 60. The value of capacitor 46 is equal to the values of capacitors 106 and 108 respectively and the value of capacitor 62 is equal to the values of capacitors 120 and 122 respectively. The value of inductor 10 is equal to half the value of inductor 44. The value of resistor 112 is equal to half the value of resistor 48. The value of inductor 124 is equal to half of the value of inductor 58 and the value of resistor 126 is equal to half the value of resistor 60.

Since the bridged T networks of FIG. 4 accomplish the same results as the lattice networks of FIG. 3, i.e., the substantially balancing out of the effect of the resistance in the tuned circuit elements of the slope equalizer of FIG. 1, the rest of the circuit of FIG. 4 is the same as that of FIGS. 1 and 3 and no further description thereof is deemed necessary.

Calculation of the performance of an arrangement as depicted in FIG. 4 shows that it operates over a bandwidth of 5% of the center frequency with the voltage developed departing from a linear slope at a 90° phase angle by less than 5% in amplitude and 10° in phase.

While there have been shown particular embodiments of this invention, it will, of course, be understood that it is not wished to be limited thereto since different modifications may be made both of the circuit arrangements and the instrumentalities employed, and it is contemplated in the appended claims to cover any such modifications as fall within the true spirit and scope of the invention.

What is claimed as new and desired to be secured by Letters Patent of the United States is:

1. In combination, first and second amplifiers, each having an input for receiving a signal lying in a predetermined frequency band between a first and second chosen frequency and having first and second pilot signals at said first and second chosen frequencies, said amplifiers having a combined output, first frequency sensitive network means connected across the input of said first amplifier, said network having a minimum impedance at a first chosen frequency and increasing impedance at frequencies between said first frenquency and a second chosen frequency, second frequency selective network means connected across the input of said second amplifier, said network having a minimum impedance at a second chosen frequency and decreasing impedance at frequencies between said first and second frequencies whereby the amplitude frequency response of one of said amplifiers has a positive slope at frequencies between said chosen frequencies and the amplitude frequency response of the other of said amplifiers has a negative slope at said in-between frequencies, means for extracting said first pilot signal from said combined output, means for extracting said second pilot signal from said combined output, means for applying said first extracted signal to the input of said first amplifier as a gain control voltage and means for applying said second extracted signal to said second amplifier as a gain control voltage whereby any difference in the pilot signal amplitudes due to frequency selective fading varies the gain of one of said amplifiers to selectively control the amplified signal as a function of frequency for maintaining the amplitude-frequency characteristic of the received signal substantially flat in spite of any frequency selective fading.

2. In a receiver for receiving transmitted signals having frequencies contained within a predetermined band and including first and second pilot signals having the frequencies of the lower and upper end of said band respectively, said first and second pilot signals having been transmitted at a predetermined amplitude, a slope equalizer comprising first and second amplifiers, each of said amplifiers having an input, said amplifiers having a combined output, first frequency selective network means connected across the input of said first amplifier having a minimum impedance to signals having the frequency of said first signal and increasing impedance at frequencies between that of said first signal and that of said second signal, second frequency selective network means connected across the input of said second amplifier having a minimum impedance to signals having the frequency of said second signal and decreasing impedance at frequencies between those of said first and second signals, means for extracting said first pilot signal from said combined output, means for extracting said second pilot signal from said combined output, means for converting said first extracted pilot signal to a first substantially unidirectional potential the amplitude of which is proportional to the amplitude of said first pilot signal, means for converting said second extracted pilot signal to a second substantially unidirectional potential the amplitude of which is proportional to the amplitude of said second pilot signal, means for applying said first unidirectional potential as a gain control voltage to said first amplifier and means for applying said second unidirectional potential as a gain control voltage to said second amplifier whereby any difference in the pilot signal amplitudes due to frequency selective fading in transmission varies the gain of one of said amplifiers to selectively control the amplified signal amplitude as a function of frequency for maintaining the amplitude frequency characteristic of the received signal substantially flat in spite of any frequency selective fading of the transmitted signals.

3. In a receiver as defined in claim 2 wherein said first minimum impedance means comprises a series combination of an inductance and a capacitance tuned to the frequency of said first signal and said second minimum impedance means comprises a series combination of an inductance and a capacitance tuned to the frequency of said second signal.

4. In a receiver as defined in claim 2 wherein said first minimum impedance means comprises a first lattice arrangement, said first lattice arrangement comprising a parallel arrangement of series and parallel networks resonant at said first signal frequency, and a second lattice arrangement, comprising series and parallel networks resonant at said second signal frequency.

References Cited by the Examiner

UNITED STATES PATENTS

| | | | |
|---|---|---|---|
| 2,160,097 | 5/39 | Weathers | 330—134 |
| 2,558,439 | 6/51 | Hurault | 330—126 |
| 3,036,276 | 5/62 | Brown | 330—140 X |
| 3,050,729 | 8/62 | Fromm | 330—147 |

FOREIGN PATENTS

| | | |
|---|---|---|
| 448,334 | 3/48 | Canada. |
| 465,887 | 5/37 | Great Britain. |

ROY LAKE, *Primary Examiner.*

BENNETT G. MILLER, NATHAN KAUFMAN, *Examiners.*